US012087257B2

(12) United States Patent
Boehnlein

(10) Patent No.: US 12,087,257 B2
(45) Date of Patent: Sep. 10, 2024

(54) GUITAR BRIDGE STRAIGHTENING APPARATUS AND METHOD

(71) Applicant: John F. Boehnlein, Broadview Heights, OH (US)

(72) Inventor: John F. Boehnlein, Broadview Heights, OH (US)

( * ) Notice: Subject to any disclaimer, the term of this patent is extended or adjusted under 35 U.S.C. 154(b) by 152 days.

(21) Appl. No.: 17/230,084

(22) Filed: Apr. 14, 2021

(65) Prior Publication Data

US 2022/0335912 A1 Oct. 20, 2022

(51) Int. Cl.

| | |
|---|---|
| ***G10D 3/04*** | (2020.01) |
| ***B21D 1/06*** | (2006.01) |
| ***G10D 1/08*** | (2006.01) |

(52) U.S. Cl.

CPC ................. *G10D 3/04* (2013.01); *B21D 1/06* (2013.01); *G10D 1/085* (2013.01)

(58) Field of Classification Search

CPC ............. G10D 3/04; G10D 1/085; B21D 1/06
See application file for complete search history.

(56) References Cited

U.S. PATENT DOCUMENTS 5,465,642 A * 11/1995 Goto ........................ G10D 1/08
84/293

OTHER PUBLICATIONS

Gibson Bridge Collapse—Haze Guitars; Nov. 12, 2020; Gibson; https://hazeguitars.com/blog/gibson-bridge-collapse, ALL.*

* cited by examiner

*Primary Examiner* — Kimberly R Lockett
(74) *Attorney, Agent, or Firm* — Ritzler Coughlin Paglia, LLC; Patrick J. Thomas, Esq.

(57) ABSTRACT

This invention is an apparatus for straightening a guitar bridge or guitar bridge assembly comprising a U-shaped receptacle with a bottom, a first face and a second face; an adjustable drive on the first face that places force on the bridge; and at least two opposing braces on the second face, and wherein the second face is grooved to create a space between the receptacle and the bridge, and wherein the first and second face contain a sight line and the apparatus contains an adjustable drive which is capable of being turned by a hex wrench so that the force of the adjustable drive on one side and the two opposing braces change the shape of the bridge to a desired shape. The invention is also related to a method for straightening a guitar bridge.

13 Claims, 8 Drawing Sheets

GUITAR BRIDGE STRAIGHTENING APPARATUS AND METHOD

BACKGROUND OF THE INVENTION

Field of the Invention

The present invention is directed to an apparatus and method for straightening or aligning a guitar bridge.

Description of Related Art

Electric stringed instruments, such as guitars, generally have strings that extend longitudinally from the top end, e.g. headstock, to some point near or at the bottom end, e.g. bridge. Typically, the bridge is a device that supports the strings on a stringed musical instrument, and in the case of an electric stringed instrument, transfers, in part, the vibration of the strings to the body of the guitar. A bridge is usually constructed from metal or other material with properties for conducting sound to the body of the instrument. Depending on the quality of the material comprising the bridge, the bridge may experience a change in shape over time for many reasons, including the tension or slow pressure of the strings over time, the fastening mechanism of the bridge to the instrument, temperature changes, or the quality of the bridge itself. The change in shape may cause the tonal and physical quality of the instrument to be compromised. The present invention is directed to an efficient and cost-effective method and apparatus for reshaping a bridge to its original shape.

SUMMARY OF THE INVENTION

The invention relates, on one hand, to an apparatus for straightening an instrument part, such as a metal bridge or bridge assembly on an electric guitar, using a receptacle capable of holding and securing a metal bridge wherein the receptable employs one or more adjustable drives to put pressure upon the bridge or bridge assembly in order to straighten the bridge to its original or desirable shape. On the other hand, the invention relates to a method of straightening an instrument part, such as a metal bridge or bridge assembly on an electric guitar by placing force on opposing and desirable positions of a bridge or bridge assembly to obtain a desired change in the shape of the bridge or bridge assembly.

Depending on the quality of the material comprising a bridge, the bridge may experience a change in shape over time for many reasons, including the tension or slow pressure of the strings over time, the fastening mechanism of the bridge to the instrument, temperature changes, or the quality of the bridge itself. The change in shape may cause the tonal and physical quality of the instrument to be compromised. Historically, a bridge would have to be removed and placed in a series of vices or clamps for an extended period of time, such as hours or days, to remove bowing and other warped conditions from the bridge. In addition to the consumption of time associated with this approach, a lack of uniformity across the bridge could result in positional differences. There is currently no known method for straightening a bridge in an efficient and cost-effective manner that results in a reshaping of the bridge to its original condition. Therefore, replacement of the bridge at significant cost proved to be the best solution. The present invention has been made in view of the circumstances associated with a bridge or bridge assembly and provides for an apparatus and method for quickly and conveniently straightening a bridge without the need for replacement.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

DETAILED DESCRIPTION OF THE INVENTION

Figure 1A:
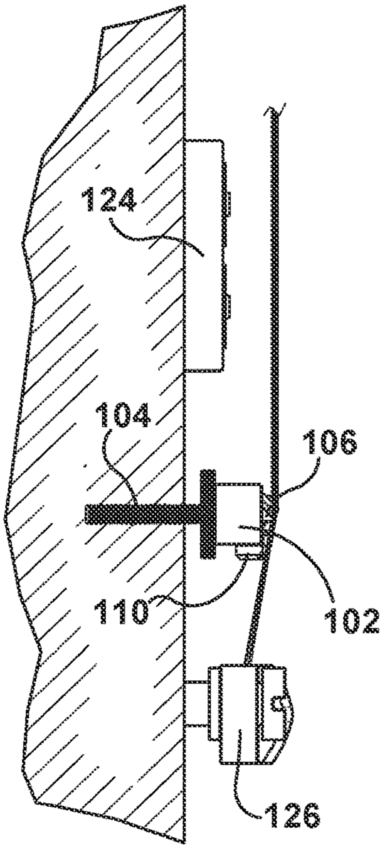
FIG. 1A is a perspective view of a typical bridge or bridge assembly showing a view from the side of the instrument.

While this invention is susceptible of embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated. The apparatus and method are designed primarily for straightening a bridge on a stringed instrument such as an electric guitar, however, the same may be applied to any sized bridge on any stringed instrument.

An important factor in a quality electric guitar is the guitar sound. The material of the body, the quality of the magnetic or other pickups, the rigidity of the guitar itself, the accuracy of the placement and spacing of the strings above the fingerboard and associated frets, the actual placement of the frets, and the quality of the bridge are all important to the overall sound and performance of the guitar. When a functional piece of the system, such as a bridge, is subject to a change in shape, a loss of symmetry, or prolonged wear, the sound and performance of the guitar can be noticeably or substantially compromised.

As is known to those skilled in the art of stringed musical instruments, such as guitars, the strings of the musical instrument extend between two critical contact points, typically provided on or at the nut of the musical instrument at one end, which may be commonly referred to as the top end, and on or at the bridge at the other end, which may commonly be referred to as the bottom end. The guitar is typically played by generating sound frequencies on the strings between the nut and the bridge, and tuned strings are manipulated by the user through use of the fret board or other means. In most cases, at the top end, the strings rest in place through grooves, or a first contact point, on the nut and are fed to tuning pegs, although some instruments are designed to have the string terminate at the nut. A tuning peg or tuning machine provided on the headstock or area behind the nut is used for adjusting the tension of the string.

In most cases at the bottom end, the strings rest in place on the bridge, or second contact point, and are either terminated at the bridge or continue on to a tailpiece (also known in the art as a stop bar) or other mechanism that is designed to secure the bottom end of the strings. Typically, a bridge may be a single piece or will be an assembly with one or more saddles that contain grooves for particular strings. Some bridges have a series of movable saddles that may be adjusted for string height above the instrument or adjusted for distance between the nut or tailpiece. A bridge on an electric stringed instrument, such as a guitar, is generally secured to the body of the guitar by one or most posts, but ideally two, by two adjustable stabilizing screw assemblies on each end of the bridge that allows the height of the bridge to be adjusted so that in turn the string height can be adjusted. Proper position of the bridge and bridge assembly is necessary in order for spacing of strings relative to one another and for purposes of distance relative to the instrument body.

Typically, one or more, but usually two, stabilizing screws secure a conventionally designed bridge to the instrument body. This attachment provides a force vector on the bridge that is perpendicular to the force on the bridge supplied by the tension of the strings. Alternately, a bridge may have additional stabilizing screws that provide force parallel to the string tension for purposes of improving the balance of force between the strings and the mounting screws.

Figure 1B:
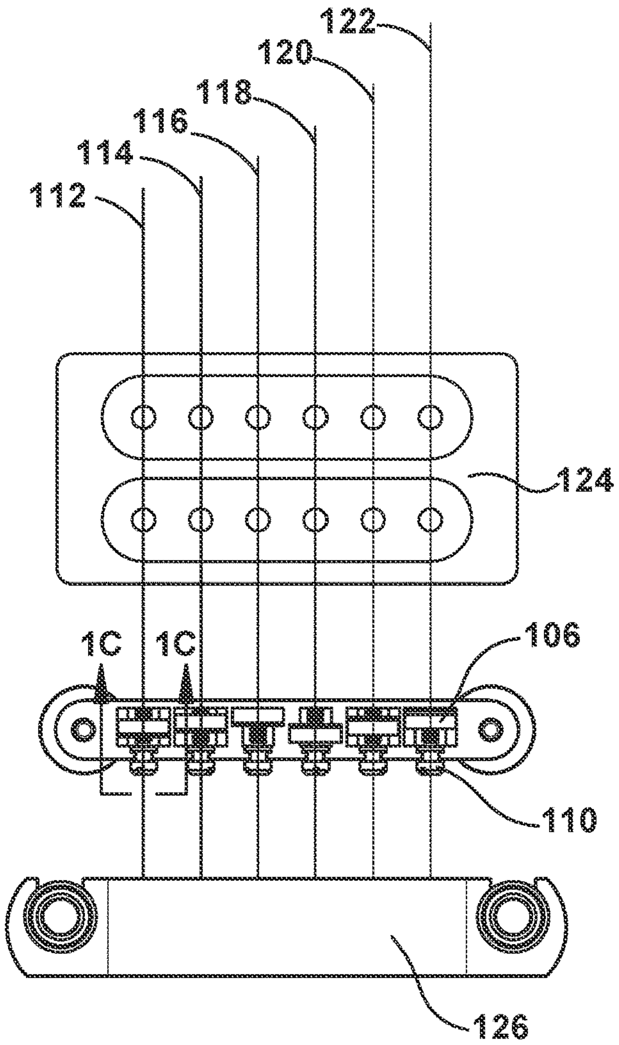
FIG. 1B is a perspective view of a typical bridge or bridge assembly showing a view from the top face of the instrument.
Figure 1C:
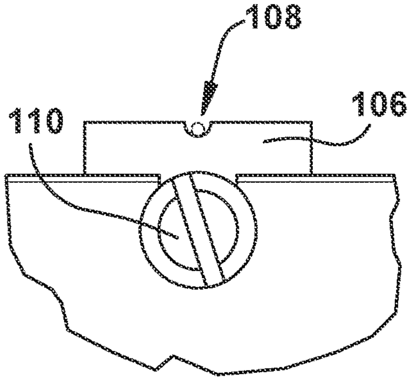
FIG. 1C is a perspective view of a typical bridge or bridge assembly showing an example of a saddle and saddle screw on the bridge or bridge assembly.

A typical bridge and bridge assembly in relation to the instrument may be seen in FIG. 1. Generally, a typical bridge assembly (102) is comprised of a mounting screw (104), a number of saddles (e.g., one for each string) (106), wherein each string passes over a respective saddle (106). Each saddle is similarly constructed and may include a uniformly-sized notch (108), through which the string passes to hold its respective string above the bridge and guitar at a desired height. Alternatively, a saddle may have no notches at all. The position of a saddle may be adjusted by the saddle screw (110). The position of each saddle (within the bridge) along the length of the guitar (i.e., in a string extension direction) may be altered to adjust the intonation of each string by the saddle screw (110). Saddles may or may not be string specific (i.e., configured to accommodate a specific string size), but in either case, may require additional adjustment in order to properly set each desired string height.

The strings 112, 114, 116, 118, 120, and 122, for example on a six-stringed instrument, are stretched initially between the bridge 102 and the nut just to tune the strings 112, 114, 116, 118, 120, and 122 to their proper respective note. The strings are attached to the guitar beyond the bridge 102 by the tailpiece 126 or string bar or stop bar. The strings pass over a pickup 124 or sound hole in order to generate sound. Then the strings 112, 114, 116, 118, 120, and 122 are stressed further by a guitar player, upon playing, by forcing the strings 112, 114, 116, 118, 120, and 122 down onto the fingerboard between frets. Because of the energy with which some players play their guitars, the strings put uneven amounts of energy on the bridge 102 over time and cause a change in shape.

Figure 2A:
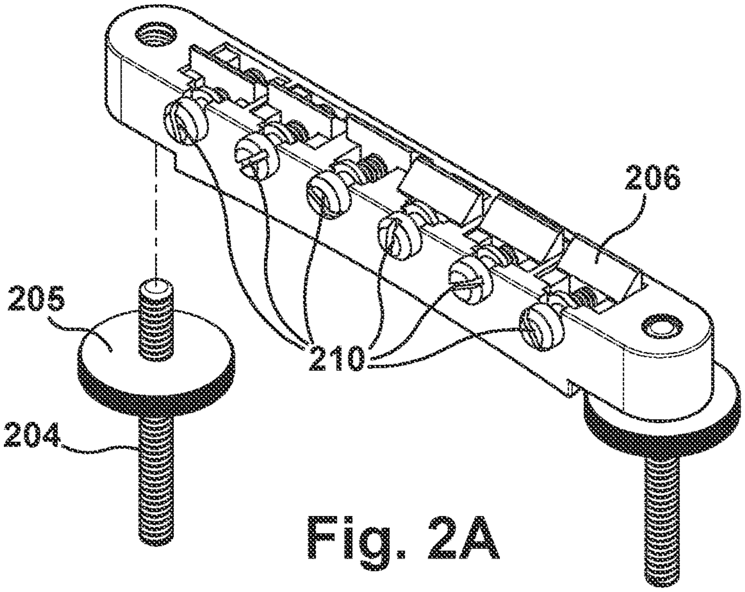
FIG. 2A is a perspective view of a bridge assembly from the perspective of the side facing the tailpiece.
Figure 2B:
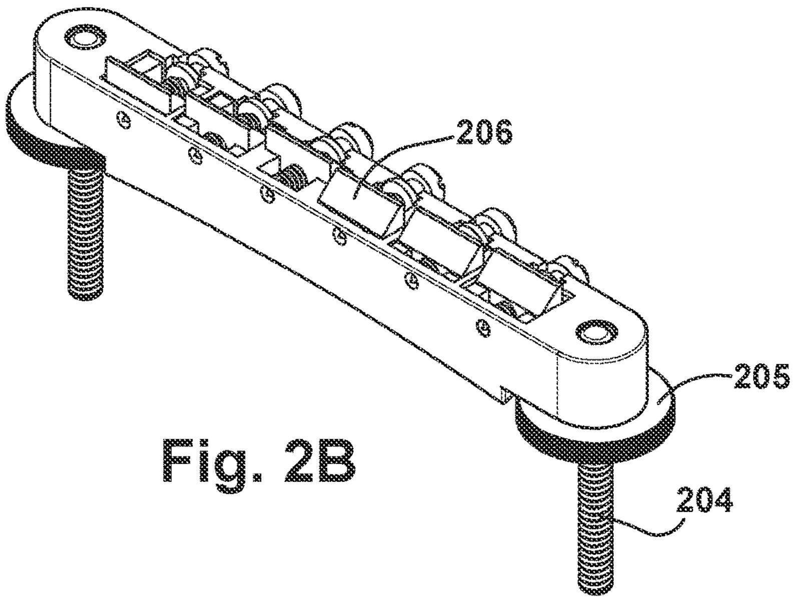
FIG. 2B is a perspective view of a bridge assembly from the perspective of the side facing the pickup.
Figure 2C:
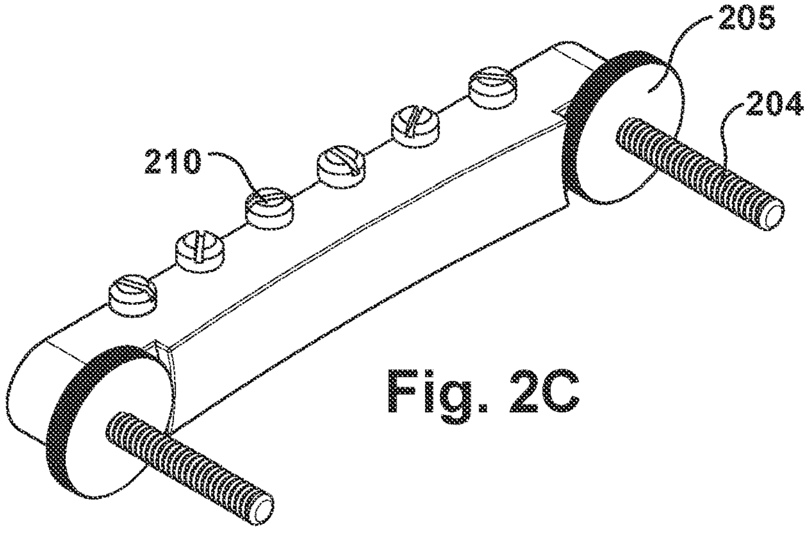
FIG. 2C is a drawing showing a bridge assembly from the perspective of the side facing and adjacent to the instrument.

FIG. 2 shows a bridge assembly from an additional vantage point and with additional detail. A bridge assembly with this design may be commonly known as a Nashville type bridge. The bridge assembly is comprised of the mounting screw 204, which has a fixed or movable plate 205 for adjusting the height of the bridge relative to the face of the instrument. The mounting screw may be secured to the instrument directly or by mounting on a post. FIG. 2A shows the front of the bridge assembly with the saddle screws 210 used for adjusting the saddles 206. The bridge is mounted on the instrument such that the saddle screws face toward the playing area or top of the guitar. FIG. 2B shows the back of the bridge assembly. FIG. 2C shows the underside of the bridge assembly with the mounting screw 204 and saddle screws 210.

A bridge and bridge assembly are typically made of metal, such as low melting point alloys. Common metals include nonferrous alloys of zinc, copper, tin, magnesium, aluminum, and iron. A bridge and bridge assembly may be comprised of any wood (such as rosewood or balsam), brass, die cast zinc, steel or stainless steel or any ferrous metal, cold-rolled steel, or chromium based metal. A bridge may be any type of plastic, including any polymer.

A coating or plating of chrome, nickel, gold or other metals may be used on a bridge. Often a bridge or bridge assembly may be composed of non-ferrous metal scraps or pot metal that are quickly and easily cast at a lower melting points such that the quality of the metal is lower and more malleable. The result is a bridge and bridge assembly that may change shape over time due to the differing tension of the strings, uneven pressures applied by the instrument player, the mounting screws, and fluctuations in temperature and humidity. The change in shape may cause the tonal and physical quality of the instrument to be compromised.

Historically, a bridge would have to be removed and placed in a series of vices or clamps for an extended period of time, such as hours or days, to remove bowing and other warped conditions from the bridge. In addition to the consumption of time associated with this approach, a lack of uniformity across the bridge could result in positional differences. I have created a device and have discovered a method for straightening a bridge and bridge assembly in an efficient and cost-effective manner that results in a reshaping of the bridge to its original condition.

Figure 3A:
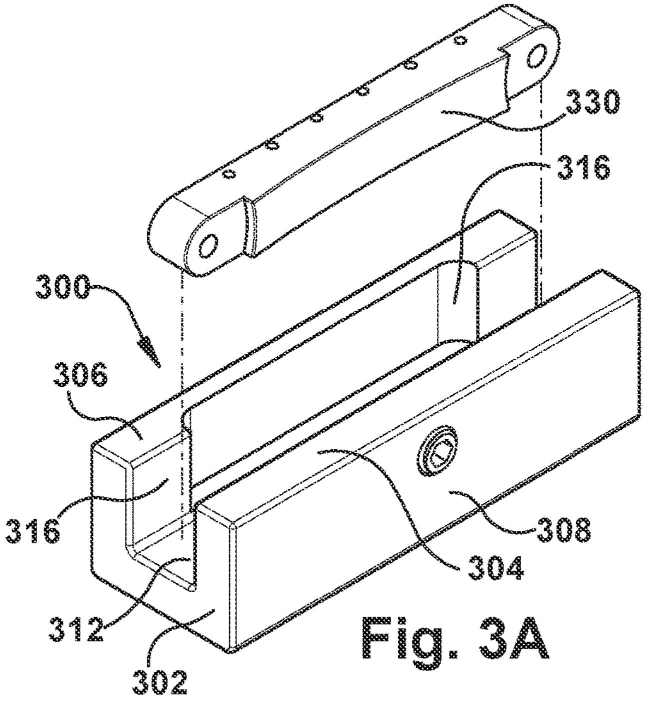
FIG. 3A is an exploded perspective view of the apparatus in conjunction with the bridge from the vantage point of the apparatus outside grooved face and the bridge saddle side.
Figure 3B:
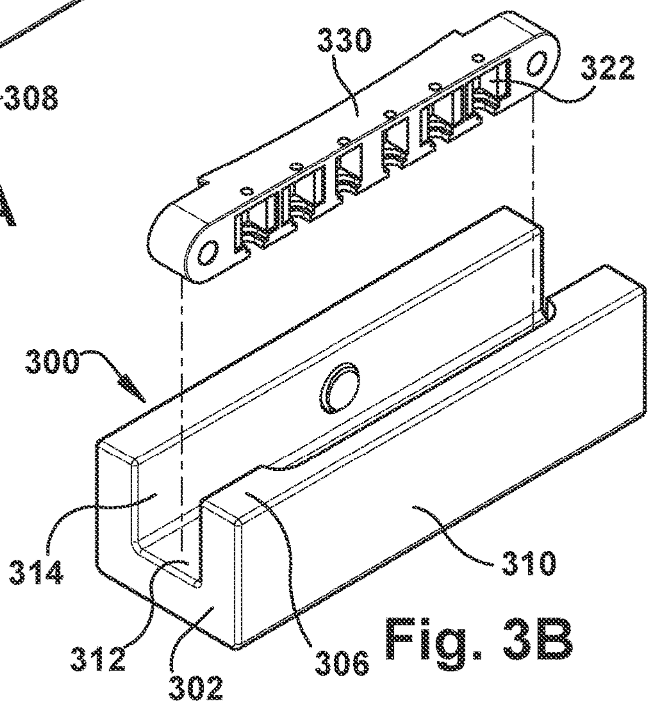
FIG. 3B is an exploded perspective view of the apparatus in conjunction with the bridge from the vantage point of the apparatus outside grooved face and the bridge saddle side.
Figure 3C:
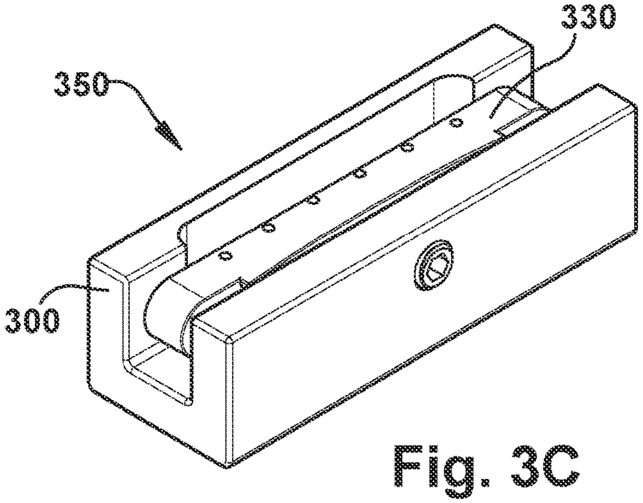
FIG. 3C is a perspective view of the apparatus in conjunction with the bridge from the vantage point of the apparatus outside flat face.

An apparatus has been designed to reshape a bridge and bridge assembly to its original condition. In one embodiment, the apparatus is comprised of a receptacle capable of holding and securing a bridge or bridge assembly. One skilled in the art will appreciate that the apparatus is a device of any useful kind as described herein. The apparatus has no direction of placement that is necessary for its correct function, and it may be rotated in any direction, held between or in the user's hands, or placed upon a surface in any desirable direction by a user to obtain the most functional or efficient use. Ideally the bridge, or instrument part to be modified, should be placed within the apparatus so that the bridge rests against one side firmly while the other side is used to apply a desirable pressure upon the bridge. For purposes of identification, I have arbitrarily, but consistently herein, designated "bottom" as being that portion of the receptacle that allows the bridge to initially rest upon and ultimately the sides of which will be braced upon. Ideally, the bridge face that has a saddle assembly (or the face of the bridge upon which the guitar strings rest) will coincide with the arbitrarily designated "bottom" portion of the apparatus. FIG. 3A shows a side view of the apparatus 300, with a short side face 302, top flat face 304, top grooved face 306 outside flat face 308, outside grooved face 310, receptacle bottom face 312, receptacle flat inside face 314, receptacle grooved inside face 316. In FIG. 3B, a bridge, 330, is inserted into the apparatus, with the saddle side of the bridge being placed against receptacle grooved inside face 316 and the combination (FIG. 3C) of the bridge 330 into the apparatus 300 is depicted by the combination 350. The grooved inside face 316 allows for space between the U-shaped receptacle and the bridge when the bridge is inserted into the receptacle or cavity so that movement of the bridge is attainable during the straightening process.

A further schematic representation of the apparatus is shown in FIG. 4. The apparatus may be comprised of a receptacle that is a single unit, or alternatively a series of conjoined pieces to comprise a single receptacle 400.

Figure 4A:
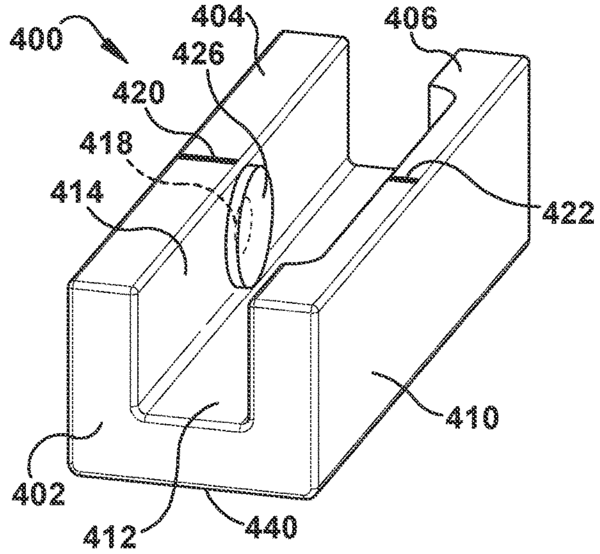
FIG. 4A is a perspective view of the apparatus primarily from the outside grooved face.

The receptacle 400 is ideally U-shaped, such that it has two side portions, a bottom portion, or base, and a top that is open, with the shape creating a receptacle or cavity for accepting the bridge or bridge assembly. Ideally, the side portions perform different functions and therefore have different features. FIG. 4 shows different schematic representations through FIG. 4A, FIG. 4B, FIG. 4C, FIG. 4D, FIG. 4E and FIG. 4F. FIG. 4A and FIG. B are a representative view from the upper side, both from the right and left, to show depth perspective. There is a short side face 402 facing outward and a short side face opposite toward the back of the drawing. The apparatus has a top flat face 404, a top grooved face 406, an outside flat face 408, an outside grooved face 410, a receptacle bottom face 412, a receptacle flat inside face 414, a back outside base 440, a receptacle grooved inside face 416 and one or more adjustable drives 418. Two top grooved face braces 405 are located at the ends of the receptacle grooved inside face 416. The U-shaped receptacle or cavity is represented by the various marks 407 and spans the length of the apparatus 400.

Figure 4B:
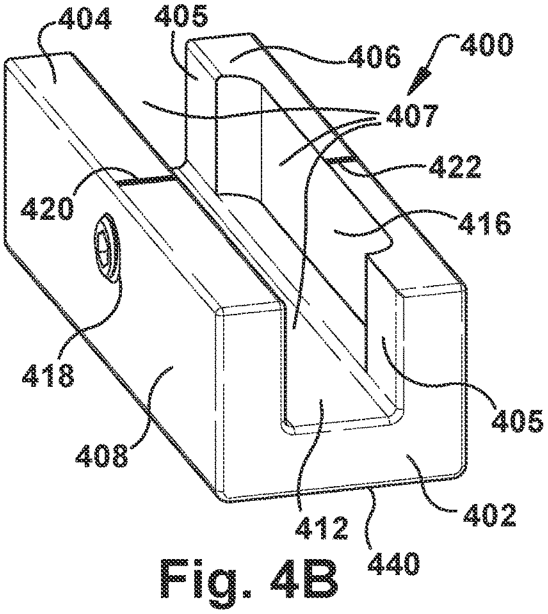
FIG. 4B is a perspective view of the apparatus primarily from the outside flat face.
Figure 4C:
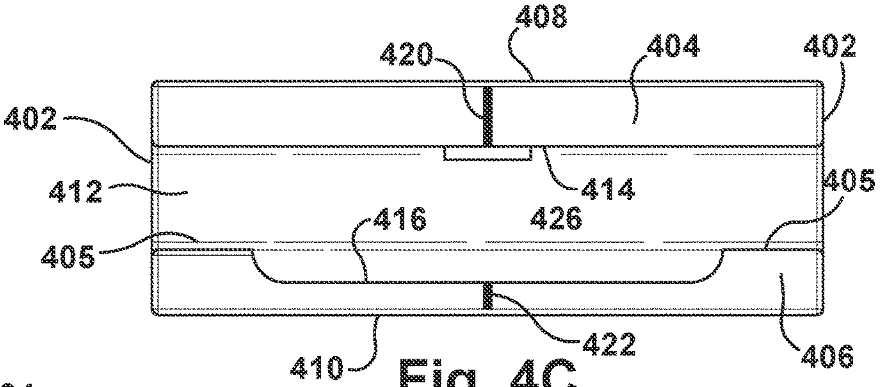
FIG. 4C is a perspective view of the apparatus into the receptacle toward the receptacle bottom face.

FIG. 4C represents a bird's eye schematic view showing the two short side faces 402 on each end of the apparatus, the top flat face 404, the top grooved face 406, the outside flat face 408, the outside grooved face 410, the receptacle bottom face 412, the receptacle flat inside face 414, the receptacle grooved inside face 416 and one or more adjustable drives 418, and the two top grooved face braces 405 which are located at the ends of the receptacle grooved inside face 416. The adjustable drive 418 has an inside adjustable drive cap 426.

Ideally, the receptacle will have the qualities of a vice or collar such that the receptable or cavity 407 will accept the placement of a bridge or other instrument piece within. Before the apparatus is engaged, the bridge or bridge assembly will be able to slide into the receptacle. The receptacle grooved inside face 416 has on its ends two top grooved face braces 405 at the ends. Between the top grooved face braces 405, the receptacle grooved inside face 416 has a bowed or displaced portion that can accommodate the bridge saddles or other protrusions that may be on the bridge. The grooved surface will allow for a convenient introduction of the bridge into the receptacle. When the apparatus is engaged, the inside adjustable drive cap 426 and the two top grooved face braces 405 will be the three points of pressure or force placed on the bridge or bridge assembly such that a single point of force in the middle of one side and two points of force on the opposing side's ends will result in the desired bending of the bridge. Because saddles typically protrude beyond the top face of the bridge, the apparatus may have a recessed section to accommodate the protrusion such as seen in the receptacle grooved inside face 416. It will be appreciated by one skilled in the art that the receptacle flat inside face 414 may also be designed to have a recessed portion that might accommodate any desirable bridge shape.

Figure 4D:
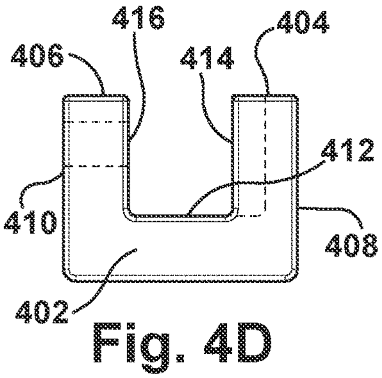
FIG. 4D is a perspective view of the apparatus from the short side face.
Figure 4E:
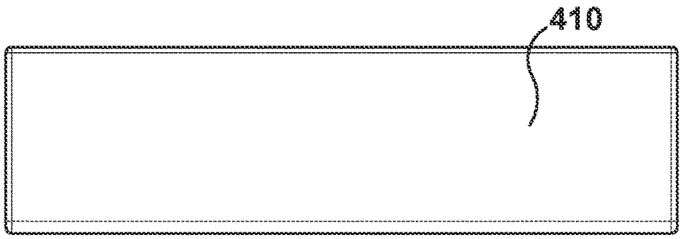
FIG. 4E is a perspective view of the apparatus from the outside grooved face.
Figure 4F:
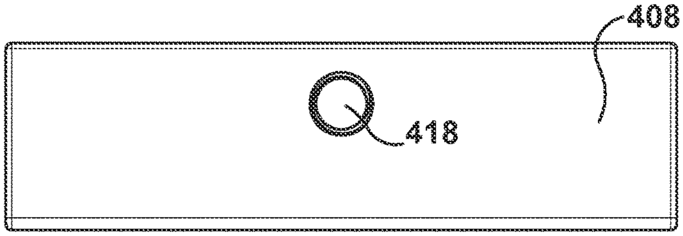
FIG. 4F is a perspective view of the apparatus from the outside flat face.
Figure 5A:
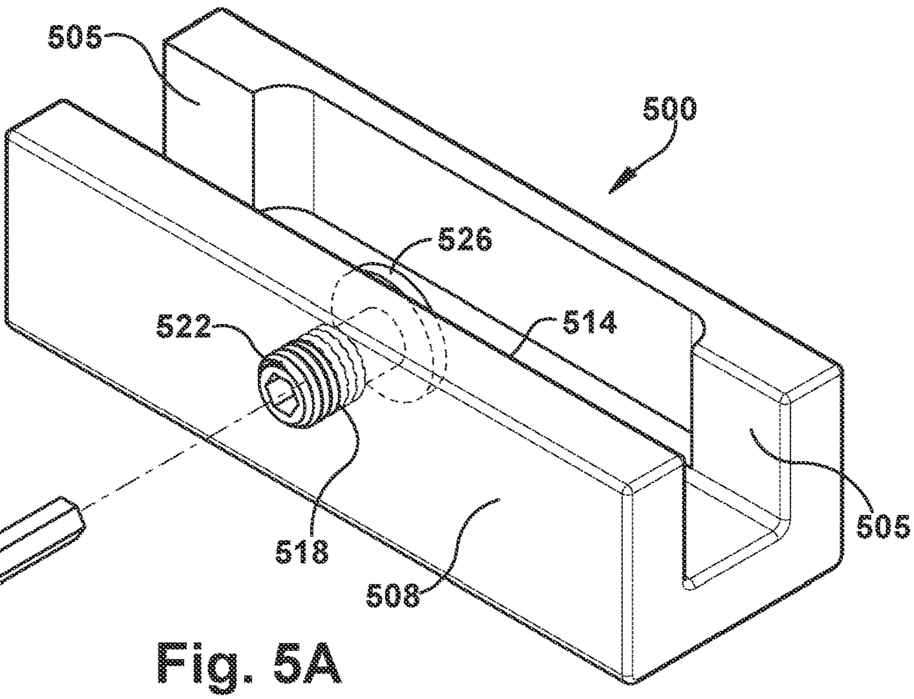
FIG. 5A is a schematic view of the adjustable drive and its placement within the apparatus.
Figure 5A:
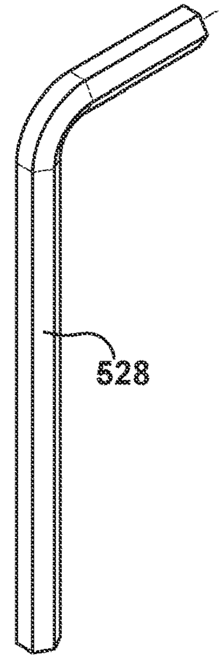
Figure 5B:
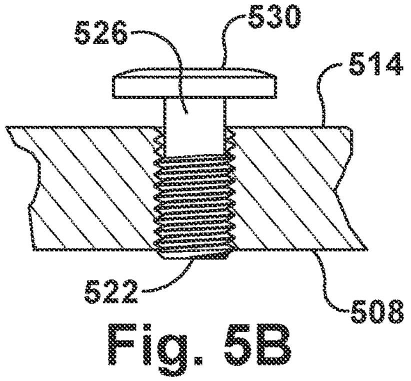
FIG. 5B is a perspective view of the of the adjustable drive and its location within the apparatus between the outside flat face and receptacle flat inside face.
Figure 5C:
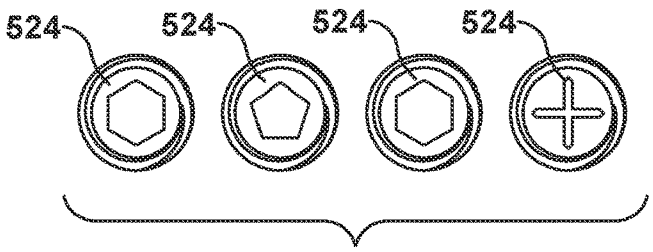
FIG. 5C is an example of the shapes of the exterior portion receptacle.
Figure 5D:
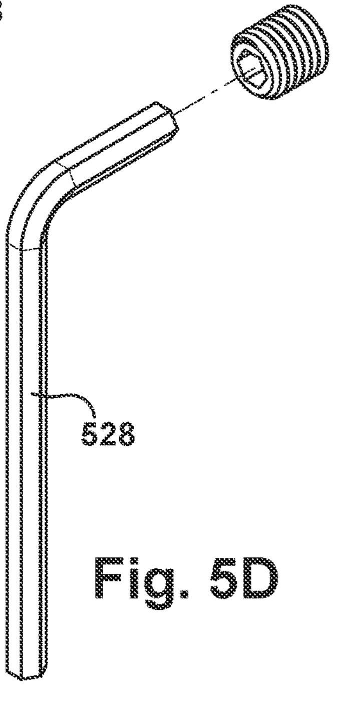
FIG. 5D is a schematic view of the adjustable drive and its placement into the exterior portion receptacle.

FIG. 4D is a view from the short face showing the U-shape and short side face 402, the top flat face 404, the top grooved face 406, the outside flat face 408, the outside grooved face 410, the receptacle bottom face 412, the receptacle flat inside face 414, and the receptacle grooved inside face 416. FIG. 4E shows the outside grooved face 410 and FIG. 4F shows the outside flat face 408 where one or more adjustable drives 418 are located. In one embodiment, it may be preferable to have one single adjustable drive 418 located at the center of the apparatus, so that when the bridge is properly and symmetrically lined up in the receptacle, the center of the bridge will be subject to the force of one adjustable drive 418, which force will be braced by the two top grooved face braces 405 to cause the straightening process.

The adjustable drive is any conceivable mechanical arrangement that will transfer a force from the receptacle flat inside face 414 to the middle of one side of the bridge, which bridge is braced on the opposing side by the top grooved face braces 405. The top grooved face braces are on the edges of the receptacle grooved inside face 416 and are opposite and opposed to the receptacle flat inside face 414 containing the adjustable drive 418.

In one embodiment, as shown in FIG. 4A, FIG. 4B and FIG. 4C, the top flat face 404 contains a first sight line 420. The first sight line 420 may be any width or depth, and ideally extends across top flat face 404 from outside flat face 408 to receptacle flat inside face 414 in a straight line. A second sight line 422 extends across top grooved face 406 from outside grooved face 410 to receptacle grooved inside face 416. Ideally, the first sight line 420 and second sight line 422 are aligned so that the user may hold the apparatus 400 in a way that allows the user to look down the sight lines 420 and 422 in order to ensure that the bridge or bridge assembly is placed at a desired location in the apparatus prior to performing the straightening procedure. Ideally the desired location of the sight line is directly in the middle of the top flat face 404 and top grooved face 406, such that the bridge or bridge assembly is aligned exactly in the middle of the sight lines. The sight lines can be of any color to aid in sighting, such as a bright color, a neon color, a fluorescent color, or any such distinguishing color, such as such as purple, red, orange, yellow, green, blue or other distinguishing color as will be useful to the user in lining up the sight lines. It may be useful to employ a small light beam or laser in or across the sight lines to ensure that the bridge is properly aligned in the apparatus.

The apparatus may be comprised of one or more materials. It is a preferred embodiment of the invention that the apparatus be comprised of metal such as, for example, aluminum, titanium, chromium, manganese, iron, copper, zinc, nickel, silver, palladium, platinum, gold, or alloys such as of iron (steel, stainless steel, cast iron, tool steel, and alloy steel), copper, aluminum, titanium, copper and magnesium or any suitable metal or alloy or combination thereof. It is also a preferred embodiment of the invention that the apparatus be comprised of aluminum, or aluminum 6061, and containing magnesium and silicon as its major alloying elements. It will be appreciated by one skilled in the art that the apparatus may be comprised of other solid materials suitable for construction and desired qualities including wood, fiberglass, glass, composites, resin, and/or plastic including such polymers as thermosets or thermoresins or thermosettings, for example, including acetal, acrylic, acrylonitrile-butadiene-styrene, alkyds, cellulosics, coumarone-indene, diallyl phthalate, epoxy, fluoropolymer, latex, malamine-formaldehyde, nitrile resins, nylon, petroleum resins, phenolic, polyamide-imide, polyarylates, polybutylene, polycarbonate, polyethylene, polyimides, petroleum resins, phenolic, polyamide-imide, polyarylates, polybutylene, polycarbonate, polyethylene, polyimides, polymethyl acrylate, polyphenylene oxide, polyphenylene sulfide, polypropylene, polytetrafluoroethylene, polystyrene, polyurethanes, polyvinyl acetate or other vinyls, polyvinyl chloride, styrene acrylonitrile, styrene butadiene latexes or other styrene copolymers, sulfone polymers, thermoplastic polyster, unsaturated polyester, urea-formaldehyde, or any suitable plastic or polymer, or any combination of such plastics or polymers. The apparatus may include a combination of one or more of the foregoing materials.

Ideally, the apparatus is designed to minimize any damage to the bridge, such as by scratching, denting or marring the surface of the bridge. The grooved inside face 416 may have protruding edges that are used to brace the bridge. The protruding top grooved face braces 405/505 may be affixed with a buffer, such as a pad, or a coating, or any non-abrasive or soft surface.

An adjustable drive 418/518 or series of drives are placed within the top side of the apparatus. It may be advantageous to have a single adjustable drive that places force in a single spot on the middle of the bridge or bridge assembly, such that when force is applied on the bridge through a single adjustable drive, the force from the top direction against the bridge will cause a desired change in shape. One skilled in the art may appreciate that more than one adjustable drive may be desired depending on the piece to be straightened. FIG. 5A, FIG. 5B, FIG. 5C and FIG. 5D are a schematic of the adjustable drive and its placement within the apparatus 500.

The adjustable drive 518 has an exterior portion 522, which is adjacent to outside flat face 508. The exterior portion 522 is a screw mechanism that when tightened, places force on the adjustable drive's interior portion, the adjustable drive cap 526, which in turn puts force upon the bridge or bridge assembly that is inserted into the apparatus. The drive's interior portion is adjacent to the receptacle flat inside face 514. The exterior portion 522 has a receptacle 524 for a driving device such as an Allen wrench or hex key 528, a penta wrench, a screwdriver, or other similar tightening device. It may be preferable that the exterior portion contain a socket or shape 524 for accepting a hex wrench but it is understood by one skilled in the art that any particular shape for accepting a corresponding device is useful, including a hexagon, a pentagon, a square or a cross. The exterior portion 522 may be comprised of metal. The adjustable drive cap 526 may be made of any suitable material including metal or plastic, or any hard material capable of exerting pressure on the bridge. The adjustable drive cap 526 may be comprised of material that is firm but will not result in scratching, marring or damaging of the bridge and bridge assembly. Alternatively, the adjustable drive cap 526 may be comprised of metal and have a coating or cover 530 on the end. The exterior portion 522 and adjustable drive cap 526 are ideally one solid piece, but may also be two conjoined pieces. The adjustable drive cap 530 may be flat, but may be rounded in order to maximize the point of force on the bridge.

The adjustable drive cap 526 or its coating 530 on the interior portion may be comprised of plastic or combination of plastics, including thermosets or thermoresins or thermosettings, for example, including acetal, acrylic, acrylonitrile-butadiene-styrene, alkyds, cellulosics, coumarone-indene, diallyl phthalate, epoxy, fluoropolymer, latex, malamine-formaldehyde, nitrile resins, nylon, petroleum resins, phenolic, polyamide-imide, polyarylates, polybutylene, polycarbonate, polyethylene, polyimides, petroleum resins, phenolic, polyamide-imide, polyarylates, polybutylene, polycarbonate, polyethylene, polyimides, polymethyl acrylate, polyphenylene oxide, polyphenylene sulfide, polypropylene, polytetrafluoroethylene, polystyrene, polyurethanes, polyvinyl acetate or other vinyls, polyvinyl chloride, styrene acrylonitrile, styrene butadiene latexes or other styrene copolymers, sulfone polymers, thermoplastic polyster, unsaturated polyester, urea-formaldehyde, or any suitable plastic or polymer, or any combination of such plastics or polymers.

The top grooved face braces 405/505 may be coated with a protective material 507 to prevent the bridge from being scratched or cracked during the adjustment process when pressure is applied to the bridge by the top grooved face braces. A coating also may be used to line the inside of the U-shaped receptacle, including the receptacle bottom face 412, the receptacle flat inside face 414, and the receptacle grooved inside face 416 so that the entire bridge is protected from scratching during the insertion of the bridge into the receptacle and the straightening process. Any suitable protective material may be used as a buffer or coating on these surfaces, such as on the top grooved face braces 405/505, the receptacle bottom face 412, the receptacle flat inside face 414, and the receptacle grooved inside face 416 to prevent the bridge from scratching or breaking. The protective material may be made of foam, rubber, plastic, cloth or fabric, or any desirable soft material. Examples of rubber coatings include natural rubber, Isoprene, styrene-butadiene rubber, butyl rubber, nitrile, NBR rubber, Neoprene, general purpose elastomers, ethylene propylene diene monomer, silicone, Viton, fluoroelastomer material, common elastomers, polyurethane, hydrogenated nitriles, or any suitable rubber material. Examples of plastic include plastics, including thermosets or thermoresins or thermosettings, for example, including acetal, acrylic, acrylonitrile-butadiene-styrene, alkyds, cellulosics, coumarone-indene, diallyl phthalate, epoxy, fluoropolymer, latex, malamine-formaldehyde, nitrile resins, nylon, petroleum resins, phenolic, polyamide-imide, polyarylates, polybutylene, polycarbonate, polyethylene, polyimides, petroleum resins, phenolic, polyamide-imide, polyarylates, polybutylene, polycarbonate, polyethylene, polyimides, polymethyl acrylate, polyphenylene oxide, polyphenylene sulfide, polypropylene, polytetrafluoroethylene, polystyrene, polyurethanes, polyvinyl acetate or other vinyls, polyvinyl chloride, styrene acrylonitrile, styrene butadiene latexes or other styrene copolymers, sulfone polymers, thermoplastic polyster, unsaturated polyester, urea-formaldehyde, or any suitable plastic or polymer, or any combination of such plastics or polymers. Examples of cloth include canvas, cashmere, chenille, chiffon, cotton, crepe, damask, georgette, gingham, jersey, lace, leather, linen, merino wool, modal, muslin, organza, polyester, satin, silk, spandex, suede, taffeta, toile, tweed, twill, velvet, viscose, wool or any suitable fabric. The protective material 507 may be applied to the top grooved face braces 405/505, the receptacle bottom face 412, the receptacle flat inside face 414, and/or the receptacle grooved inside face 416 with any adhesive, including anaerobics, cyanoacrylates, toughened acrylics, epoxies, polyurethanes, silicones, phenolics, polyimides, hot melts, plastisols, polyvinyl acetate (pvas), pressure-sensitive adhesives or any suitable adhesive.

The size of the apparatus may be any size. In one embodiment, the size of the apparatus is similar to the bridge or bridge assembly so that the desired effect be obtained. The apparatus can be constructed so that it is capable of straightening Nashville type bridges, which bridges normally support a six-stringed instrument. However, the apparatus can be made to support the bridges of other stringed instruments, such as four string, five string, seven string, eight string, and twelve or more string instruments, and may be used for bridges on electric, bass and some acoustic guitars.

Figure 6A:
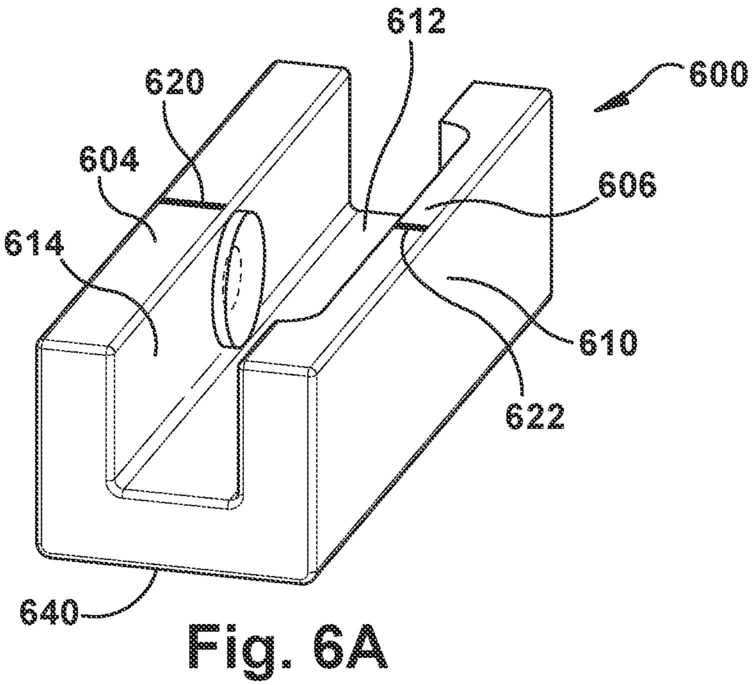
FIG. 6A is a perspective view of the apparatus primarily from the outside grooved face in a preferred embodiment.
Figure 6B:
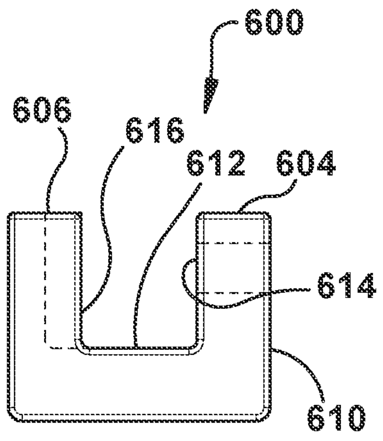
FIG. 6B is a perspective view of the apparatus from the short side face in a preferred embodiment.

FIG. 6 is a schematic showing the desired measurements of the apparatus for a six-stringed instrument. As shown in FIG. 6A, the apparatus has a length along the outside flat face 608 and outside grooved face 610 of 3.5 inches, but may be in the range of one to six inches depending on the desired size of the target bridge. The top flat face 604, top grooved face 606, receptacle bottom face 612, receptacle flat inside face 614, receptacle grooved inside face 616 and back outside base 640 also have a length of 3.5 inches, but may in in the range of one to six inches. In one embodiment, in conjunction with the length, the apparatus FIG. 6B has a width of 1.25 inches on short side face 602, which extends from the outside flat face 608 and outside grooved face 610 and the range of the width may be from 0.5 inches to five inches. The apparatus FIG. 6B may have a height of 1.25 inches, which extends from top flat face 604, on one side, and the top grooved face 606, on the other side, to the back outside base 640, and the height may be in a range from 0.5 inches to five inches. The adjoining corners, or interface between the top flat face 604 and the top grooved face 606, and the back outside base 640 may be curved or rounded so that the apparatus may fit comfortably in the user's hand. The curvature is preferentially an arc of $\frac{5}{16}$ of an inch, but one skilled in the art can appreciate that this curvature may be modified to obtain a desired ergonomic design while ensuring the back outside base remains flat enough to ensure the apparatus can be used on a flat surface as opposed to being handheld. For example, the curvature may be in the range of $\frac{1}{16}$ of an inch to $\frac{15}{16}$ of an inch. The apparatus shown in FIG. 6B has a receptable or cavity for placement of the bridge or bridge assembly. The receptacle is a chamber between the top flat face 604, on one side, and the top grooved face 606 on the other side. The top flat face 604 and the top grooved face 606 extend from one short side face 602 to the other short side face 602. The top flat face 604 extending from outside flat face 608 to the receptacle flat inside face 614 has a width of $\frac{3}{8}$ inch, and may be a width in the range of $\frac{1}{8}$ to $\frac{3}{4}$ of an inch. The top grooved face 606 extending from the outside grooved face 610 to the receptacle grooved inside face 616 also has a width of $\frac{3}{8}$ inch on the ends extending in both longitudinal directions for $\frac{5}{16}$ inch and then curving inward to a width of $\frac{5}{32}$ inch. The receptacle flat inside face 614 (extending from receptacle bottom face 612 to the top flat face 604) and the receptacle grooved inside face 616 (extending from receptacle bottom face 612 to the top grooved face 606) have a height of $\frac{17}{32}$ and form the top and bottom of the receptacle, respectively. The receptacle bottom face 612 has a varying width between the receptacle flat inside face 614 and receptacle grooved inside face 616 because of the curvature of receptacle grooved inside face 616. The width starts at each longitudinal end of receptacle grooved inside face 616 and has an inside depth of any desire length. The first sight line 620 is a small channel across the top flat face 604 and the channel may be $\frac{1}{8}$ inch in depth and $\frac{1}{8}$ inch in width, but a range of $\frac{1}{4}$ inch to $\frac{1}{16}$ inch would be an appropriate range for visually aligning the apparatus. The second sight line 622 is a small channel across the top grooved face 606 and the channel may be $\frac{1}{8}$ inch in depth and $\frac{1}{8}$ inch in width, but a range of $\frac{1}{4}$ inch to $\frac{1}{16}$ inch would be an appropriate range for visually aligning the apparatus. Modifications may be made to any of the foregoing measurements or distances to obtain the desired apparatus. One skilled in the art can appreciate that the measurements may be extrapolated to generate an apparatus for longer or shorter bridges, regardless of string numbers.

Figure 7:
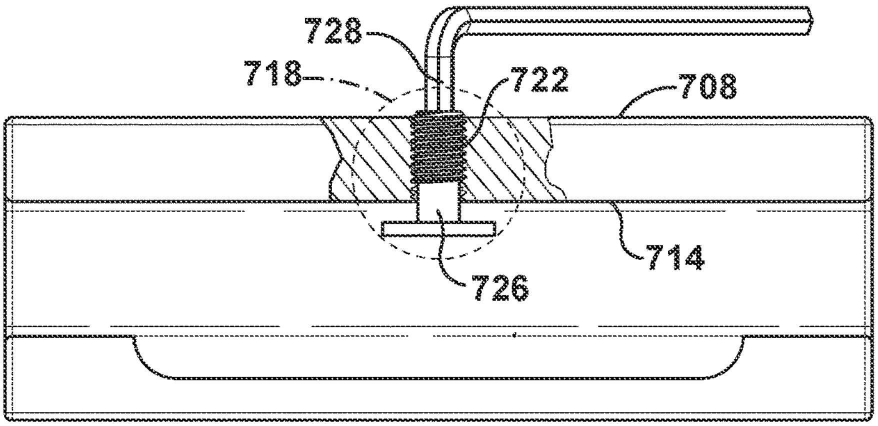
FIG. 7 is a schematic view of the apparatus showing the features of the adjustable drive.

FIG. 7 is a schematic showing the desired measurements of the inlet for the adjustable drive for an apparatus for a six-stringed instrument. The adjustable drive 718 is manipulated, that is, tightened and loosened as is necessary, by an external wrench or driver 728. Alternatively, the apparatus may be assembled as a single unit, such that adjustable drive 718 is comprised of a handle 732 that allows the user to turn an exterior portion 722, which is adjacent to outside flat face 708. Alternatively the handle 732 may be a separate piece affixed to the exterior portion 722. The exterior portion 722 is a screw mechanism that when tightened, places force on the adjustable drive cap 726. The adjustable drive can be any appreciable size, such that the diameter of both the exterior portion 722 and adjustable drive cap 726 proceed through a hole in the apparatus. The hole can be any size, but preferably ¼ inch in diameter, but the size may be in the range of 1/10 inch up to 1.2 inch. It is a preferred embodiment of the invention that the adjustable drive be placed in the middle of outside flat face 708 and extending through to the inside flat face 714. The external drive is placed, in one direction, half way between each short side face 702 and at a distance half way between the receptacle bottom face 612 to the top grooved face 606. The placement of external drive should take into consideration the desired size of the target bridge to ensure that the adjustable drive cap 726 properly meets the bridge for the straightening process. However, any desirable placement of the adjustable drive will work if the desired effect is obtained.

Figure 8A:
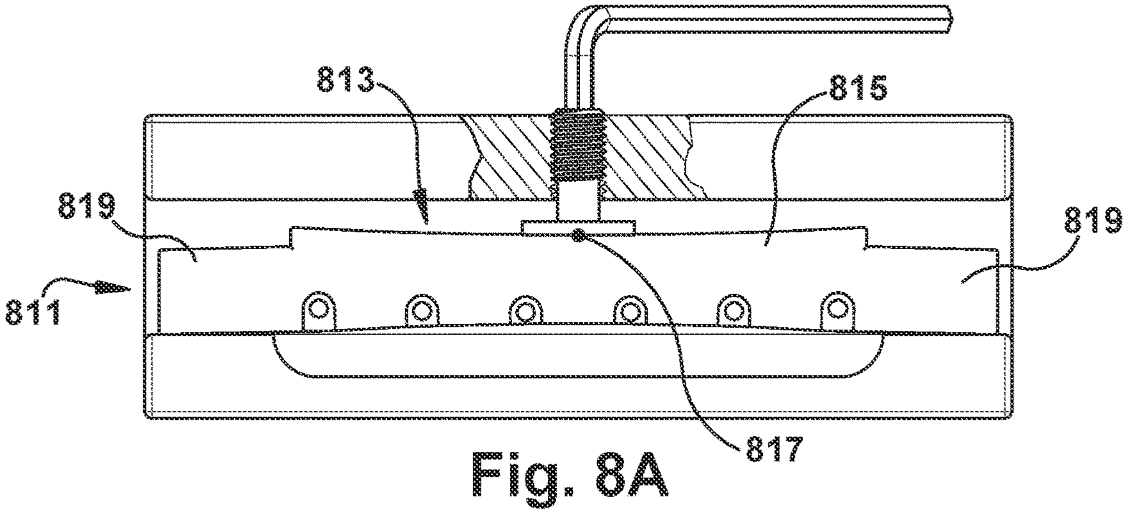
FIG. 8A is an illustration showing a misshapen bridge or bridge assembly placed within the apparatus before the bridge or bridge assembly is straightened by the apparatus.
Figure 8B:
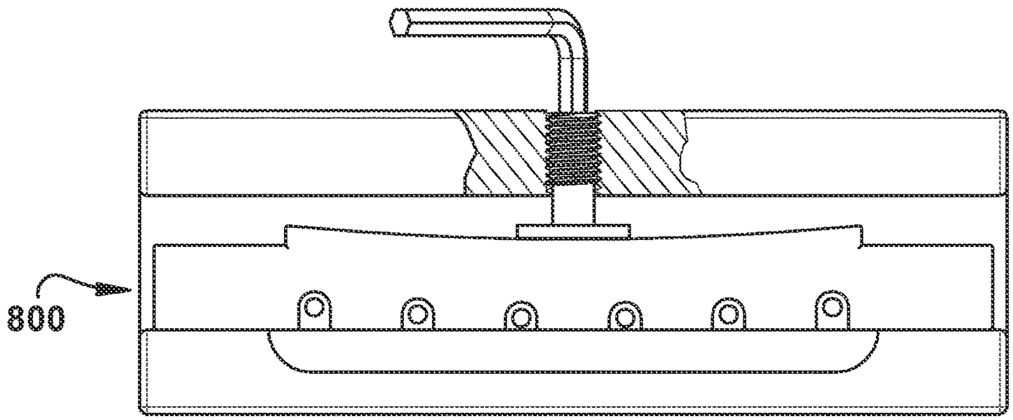
FIG. 8B is an illustration showing a misshapen bridge or bridge assembly placed within the apparatus after the bridge or bridge assembly is straightened by the apparatus.

It one embodiment of the invention, there is method to straightening a bridge or bridge assembly. In order to accomplish the method, as shown in FIG. 8A, there is a misshapen bridge 811 that has an undesirable arc to either side with an undesirable concave side 813 and a an undesirable convex side 815. Force is applied on the bridge at three points with one force point being on the portion of the bridge that is experiencing a convex shape and ideally force is applied in the middle of the convex shape, at point 817. The other two force points are on the opposing side of the bridge at the edges, which side is concave 813, ideally at the ends, or at points 819. When the three force points are applied, the bridge will be straightened and result in bridge 800 shown in FIG. 8B. If too much force is applied, the bridge may be flipped and the process reversed until the desired straight shape is attained.

Figure 9A:
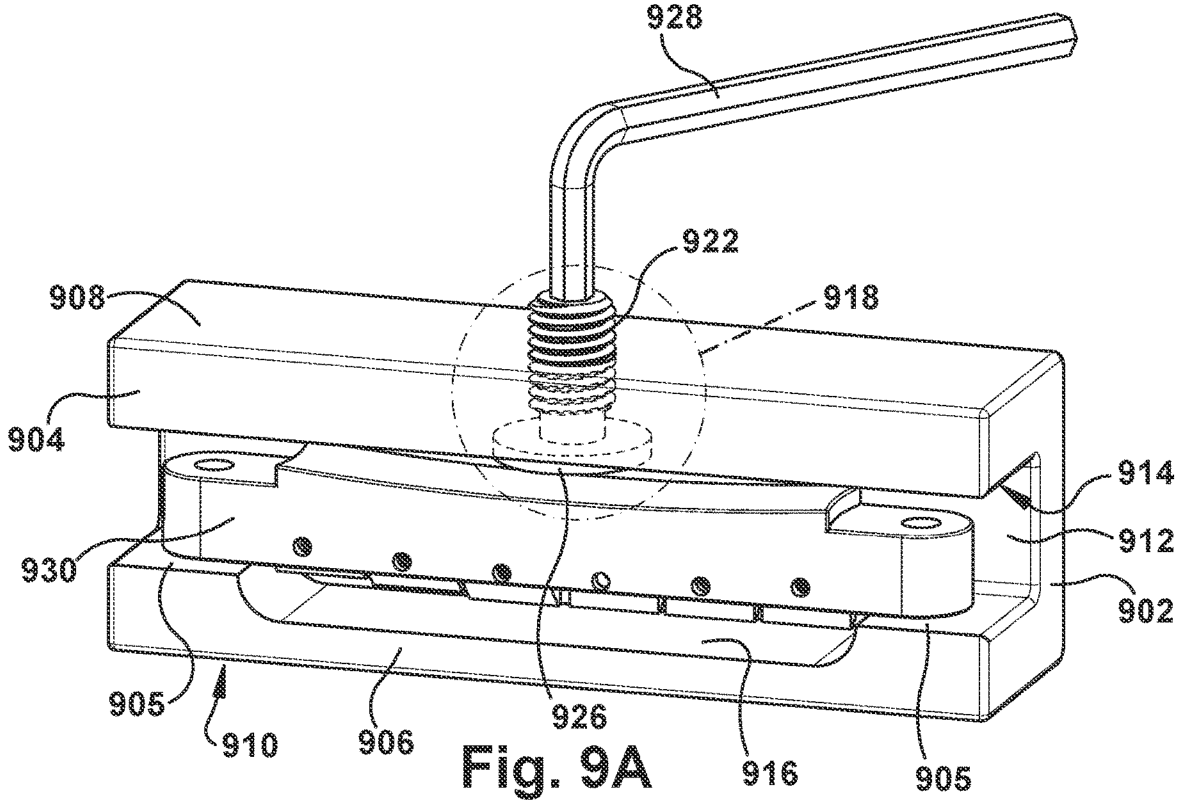
FIG. 9A is an illustration showing the bridge or bridge assembly within the apparatus before the adjustable drive is engaged.
Figure 9B:
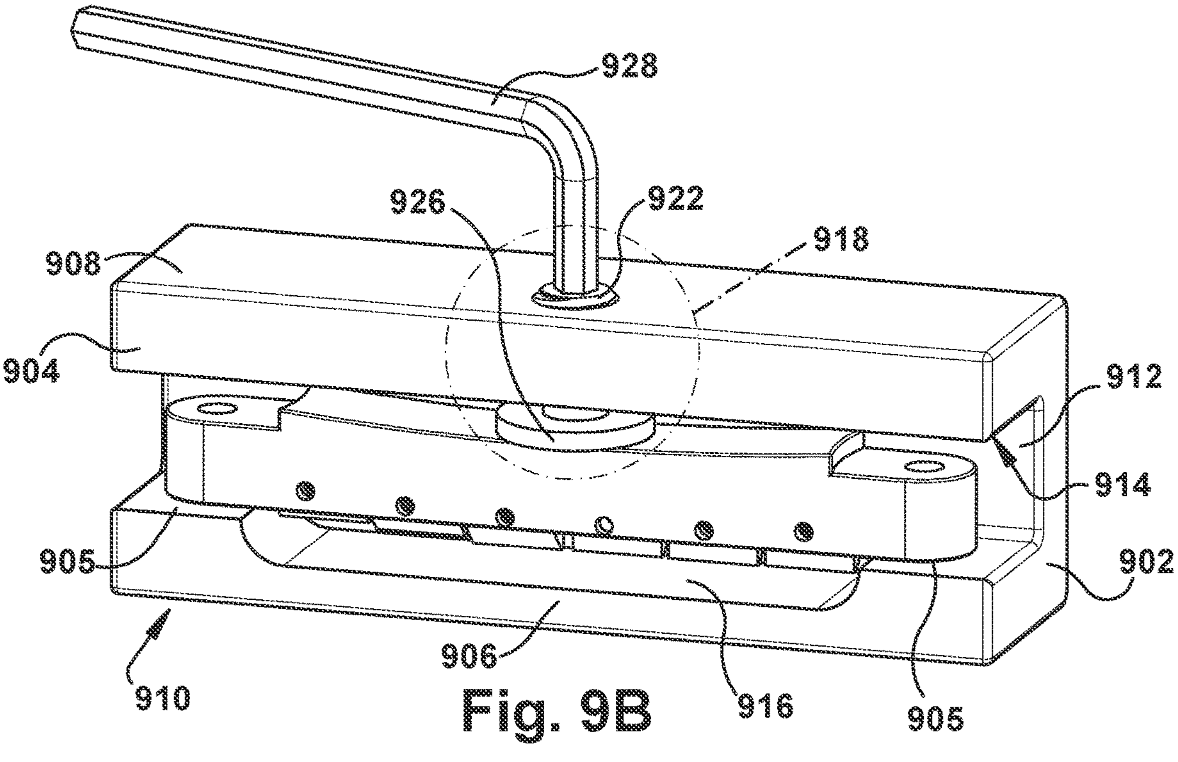
FIG. 9B is an illustration showing the bridge or bridge assembly within the apparatus after the adjustable drive is engaged and the placement of the adjustable drive cap on the bridge or bridge assembly.

The apparatus has been designed to accomplish the task shown in FIG. 8. FIG. 9 shows two illustrations: first a bridge inserted into the apparatus in FIG. 9A; and the apparatus being engaged by turning the adjustable drive in FIG. 9B. A side view of the apparatus 900, with a short side face 902, top flat face 904, top grooved face 906 outside flat face 908, outside grooved face 910, receptacle bottom face 912, receptacle flat inside face 914, receptacle grooved inside face 916. A bridge, 930, is inserted into the apparatus, with the side of the bridge experiencing a concave edge preferably being placed against receptacle grooved inside face 916. The adjustable drive 918 is manipulated by the user by tightening the adjustable drive with an external wrench or driver 928 so that the exterior portion 922 forces the adjustable drive cap 926 against the bridge assembly. As the adjustable drive cap places force on the bridge assembly, the bridge is braced against the top grooved face braces 905. The amount of force placed on the adjustable drive 918 is determined by the amount of movement needed, the composition of the bridge, the ambient temperature, and other considerations. After use, the bridge 830 may be removed by the user and examined. If additional force is necessary to perform additional straightening, the process can be repeated. If too much force is applied and the bridge curves the other way, the bridge can be inserted in the apparatus in the opposite way in order to reverse the over-straightening that occurred.

What is claimed is:

1. A handheld apparatus for straightening a guitar bridge comprising:

a U-shaped receptacle with a bottom, a first face and a second face;

an adjustable drive on the first face;

at least two opposing braces on the second face; and wherein the second face is grooved.

2. The apparatus of claim 1 wherein the first face and second face contain a sight line.

3. The apparatus of claim 2 wherein the sight line is a distinguished color.

4. The apparatus of claim 1 wherein the adjustable drive is capable of being turned by a hex wrench.

5. The apparatus of claim 1 wherein at least one opposing brace is coated.

6. The apparatus of claim 1 wherein the adjustable drive comprises a built-in handle.

7. The apparatus of claim 1 wherein the U-shaped receptacle is comprised of aluminum.

8. The apparatus of claim 1 wherein the U-shaped receptacle is coated.

9. A handheld apparatus for straightening a guitar bridge or guitar bridge assembly comprising:

a U-shaped receptacle with a bottom, a first face and a second face;

an adjustable drive on the first face;

at least one opposing brace on the second face;

wherein the second face is grooved; the first face and second face contain a sight line; and the adjustable drive is capable of being turned by a hex wrench.

10. The apparatus of claim 9 wherein the opposing brace is coated.

11. The apparatus of claim 9 wherein the adjustable drive comprises a built-in handle.

12. The apparatus of claim 9 wherein the U-shaped receptacle is comprised of aluminum.

13. The apparatus of claim 9 wherein the U-shaped receptacle is coated.

* * * * *